Figure 1:
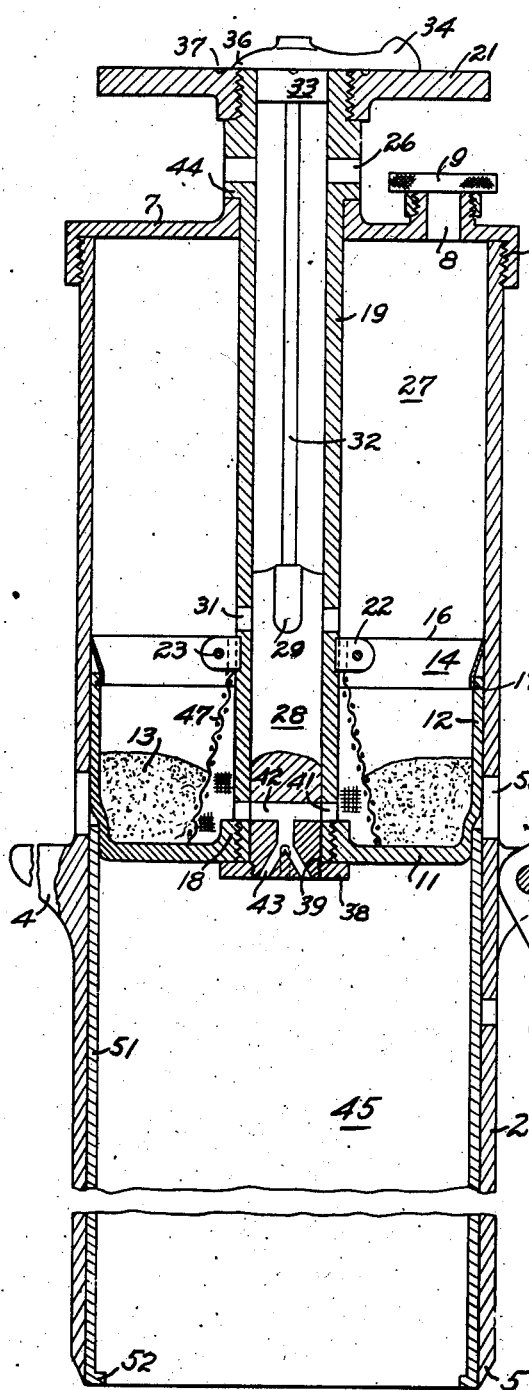

May 29, 1945.  W. W. KEOWN  2,376,970
GARDEN IMPLEMENT
Filed July 25, 1944

INVENTOR
Walter W. Keown
BY Charles S. Evans
his ATTORNEY

Patented May 29, 1945

2,376,970

UNITED STATES PATENT OFFICE 2,376,970

GARDEN IMPLEMENT

Walter W. Keown, San Leandro, Calif.

Application July 25, 1944, Serial No. 546,458

8 Claims. (Cl. 47—1)

The invention relates to tools for aiding the transplanting and dusting of small plants.

One of the objects of the invention is the provision of a garden tool, the use of which permits the transplanting of small plants without shock or injury.

Another object of the invention is the provision of a transplanting tool including mechanism by which the plant may be dusted before its release from the tool.

My invention possesses other objects and features of value, some of which with the foregoing will be set forth in the following description of the invention. It is to be understood that I do not limit myself to the showing made by the said description and the drawing as I may adopt variant forms of the invention within the scope of the appended claims.

Referring to the drawing:

Figure 1 is a vertical central section showing my transplanting tool. Portions of the figure are omitted to reduce its size.

Figure 2:
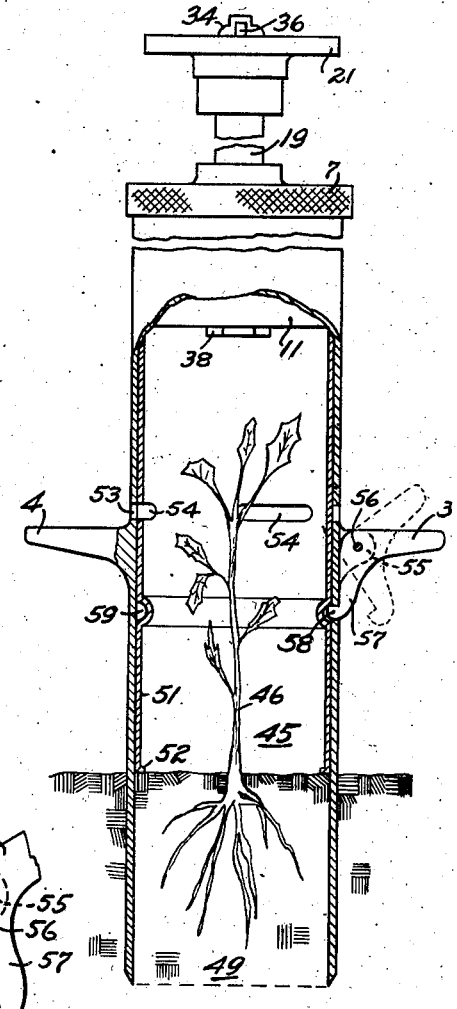

Figure 2 is a combined elevation and vertical section, the plane of section passing through the long axis of the implement. The tool is shown after its insertion into the ground around a plant to be lifted. Portions of the upper part of the tool are omitted to reduce the length of the figure.

In terms of broad inclusion, the garden tool of my invention comprises a cylinder having an open end so that it may be placed over a small plant and pressed down into the ground to surround the root clump of the plant. A piston is arranged in the cylinder with a piston rod extending through the top closure thereof to a handle so that the piston may be moved up and down in the cylinder. Extending on the side of the piston opposite the piston rod and lying against the inside wall of the cylinder is a cylindrical flange, terminating at its lower end in a small internal bead. This cylindrical flange is raised with the piston before the cylinder is pushed over a plant when the piston is pushed down; and its function is to eject the clump of dirt from the cylinder and into the previously formed hole which is to be the new location of the plant. The shape of the piston is generally that of a cup so that a quantity of dusting powder may be carried therein. Valve controlled passages are disposed in the piston rod to permit free movement of the piston and so that after the plant is in place, the piston may be pulled up to discharge a cloud of dust into the lower part of the cylinder which at this time surrounds the plant above ground. The valves are so arranged that in one position, raising the piston will discharge dust into the lower part of the cylinder; and in the other position will merely open the upper portion of the cylinder to the air so that the piston may be moved freely. This arrangement permits the transplanting tool to be used solely for transplanting or solely for dusting; but preferably it is used to dust each plant as it is transferred to its new location.

In terms of greater detail, my garden tool comprises a cylinder 2 having lugs 3 and 4 extending outwardly on two opposite sides of the cylinder to provide a hand hold or step by which the cylinder may be pressed into the ground. The lower edge 5 of the cylinder is preferably sharpened as shown to facilitate its entry into the soil. The upper end of the cylinder is provided with threads 6 so that a cylinder head 7 may be demountably secured thereon to close that end of the cylinder. A flanged filler opening 8 is formed in the head and normally closed by a filler cap 9 threaded thereover. Slidably mounted in the cylinder is a piston 11 with upturned walls 12, forming a cup adapted to hold a quantity of dusting powder 13 which may be loaded into the cylinder top through the filler opening 8.

A resilient ring 14, having an upper knife edge 16 bearing against the cylinder wall, is sprung into a groove 17 formed on the inside of the cup rim; and serves the purpose of scraping the walls of the cylinder clean of powder during use of the implement. Threaded into the flange 18, extending upwardly from the piston 11, is a hollow piston rod 19, the upper end of which is threaded to receive the handle 21.

A stop collar 22 made in two halves and secured by screws 23 in a shallow groove formed in the piston rod, limits the upward movement of the piston. The upper end of the hollow piston rod is provided with vent apertures 26 which may be placed in communication with the interior chamber 27 of the cylinder by means of a rotary valve 28, disposed in the lower end of the piston rod and provided with recesses 29 on opposite sides thereof. The adjacent wall of the piston is provided with opposite ports 31 placed to register with the recesses 29 when the valve 28 is turned 90° from the closed position shown in Figure 1. To facilitate the turning of the valve, it is provided with a valve stem 32, extending upwardly in the bore of the piston rod and terminating at the handle 21 in a stub journal 33 formed on the under side of the adjusting lever 34, and journaled in the upper end of the bore.

The adjusting lever has a point 36 and the adjacent surface of the handle 21 is formed with depressed indicia 37, spaced at 90° intervals and showing the two positions of the valve with appropriate markings. Axial movement of the valve 28 in the piston rod is prevented by a collar 38 threaded onto the lower end of the valve and seating tightly against a shoulder 39 on the valve and with a running fit against the lower surface of the piston. The lower end of the rod is also provided with oppositely disposed ports 41, preferably lying in the same axial plane as the ports 31. In the position shown in Figure 1 with the ports 31 closed, the ports 41 are in register with the passage 42 which opens upon the bottom of the valve in the branch passages 43.

With the parts in their lowermost position as shown in Figure 1, and as determined by the engagement of the shoulder 44 on the piston rod against the cylinder head, raising the piston compresses the air in the chamber 27 which then escapes through the ports 41 into the passages 42 and 43, blowing down over and entraining dust from the supply lying in the bottom of the cup so that the entire lower chamber 45 below the piston is filled with the dust and the plant 46 lying in the chamber as shown in Figure 2 is covered with it.

In order to prevent undesired quantities of dust in the air blast through the ports 41, and permit only a small quantity to be entrained, a conical screen 47 is placed between the bottom of the cup and the stop collar 22. The bulk of the dust is retained by the screen so that the ports are not clogged with it and the air flow may pass over the surface picking up a small quantity.

When the implement is to be used to raise a plant and root clump, the valve handle 34 is turned to align the ports 31 and recesses 29 so that air may pass freely in and out of the upper chamber 27, as the piston is raised preparatory to seating the cylinder over the plant. At this time of course, the dusting passages are closed.

Means are provided for ejecting the mass of dirt 49 surrounding the root of the plant after the same has been lifted in the tool. Secured to the piston and extending downwardly below it into the lower portion of the cylinder is a relatively thin cylindrical flange 51, terminating at its lower end in a short inturned bead 52. When the piston and the handle 21 are in their lower positions as shown in Figure 1, the bead 52 constituting the lower end of the cylindrical flange, is even with the sharp lower edge of the cylinder; and when the piston is raised by the handle, the flange is also raised into the position shown in Figure 2. The tool is now in condition to be set over the plant to be transplanted, and pressed into the soil.

In order to prevent trapping the air in the chamber 44 when the implement is pushed down over the plant to encompass the roots, oppositely disposed ports 53 are formed in the wall of the cylinder immediately above the steps 3 and 4 and circumferentially elongated ports 54 are disposed about the wall of the cylindrical flange 51 so that with the lifting of the handle 21 to its highest position, one of the ports 54, of which there are three, will be in alignment with one of the ports 53, of which there are two. By arranging the ports in this manner, there will always be an alignment of ports 53 and 54 when the flange is raised to its highest position in the cylinder, irrespective of rotary relation between the flange and cylinder.

After the plant with its clump of soil and roots has been enclosed, the implement may be picked up to lift the clump, transferred to the desired location and deposited in a hole previously made with the implement. The tool is then lifted while the piston is pushed in, which ejects the dirt mass from the bottom of the cylinder leaving the bead 52 aligned with the lower edge of the cylinder as shown in Figure 1. During this ejecting movement of the piston and handle, the valve 28 has been in the position to permit the passage of air through the vent apertures 26, recesses 29 and ports 31 into the chamber 27. If the valve is now turned to the position shown in Figure 1 and the implement is held against the ground around the plant, the piston may be raised to compress the air in the chamber 27 and blow dust downwardly around the plant.

While it is desirable to insure against various plant diseases by thoroughly dusting the plant immediately after it has been transplanted into its new bed, the implement may be utilized as long as the plant size permits to apply dust without using it as a transplanter. Where it is desired to merely transplant and not dust the plant, the valve 28 is kept in the position to close the ports 41; and the implement may then be used to prepare holes in the growing bed and to pick up and transfer the young plants to them.

Since it is desirable sometimes when pushing the implement into the soil about a plant to apply pressure on the handle 21, means are preferably provided for locking the handle, piston rod and connected piston and cylindrical flange in their uppermost position. This is accomplished by mounting the step 3 between two lugs 55 upon a pivot pin 56. The step so mounted is formed with a downwardly extending lug 57 lying flush against the cylinder wall and having an inturned lug 58 extending through the cylinder wall to engage in an annular groove 59, rolled or otherwise formed in the cylindrical flange 51. Preferably the pivotal bearing is snug enough so that while the step may be moved with the fingers, it tends to remain in its adjusted position, either to lock the parts as shown in Figure 2, or to permit relative movement therebetween when raised to the position shown in dotted lines.

I claim:

1. A garden implement comprising an open end lifting cylinder for encircling the root clump of a plant, a piston slidable in the cylinder and having an annular ejecting flange for pushing the clump out of the cylinder, a handle for moving the piston in the cylinder, a dust cup disposed on the top of the piston, and valve controlled passages from the dust cup to the chamber below the piston and from the chamber above the piston to the open air.

2. A garden implement comprising an open end lifting cylinder for encircling the root clump of a plant, a piston slidable in the cylinder and having an annular ejecting flange for pushing the clump out of the cylinder, a hollow piston rod terminating in a handle for moving the piston in the cylinder, and a valve controlled passage connecting the interior of the cylinder with the open air through said hollow piston rod.

3. A garden implement comprising an open end lifting cylinder for encircling the root clump of a plant, a piston slidable in the cylinder and having an annular ejecting flange for pushing the clump out of the cylinder, a hollow piston rod terminating in a handle for moving the piston in the cylinder, a valve controlled passage connecting the interior of the cylinder with the open air through said hollow piston rod, and a valve setting lever on said handle.

4. A garden implement comprising an open end lifting cylinder for encircling the root clump of a plant, a piston slidable in the cylinder and having an annular ejecting flange for pushing the clump out of the cylinder, a head closing one end of the cylinder, a hollow piston rod slidable in said cylinder head and terminating in a handle for moving the piston in the cylinder, and valve controlled passages in the piston rod for optionally connecting the chamber between the piston and the head to the open air or to the chamber on the opposite side of the piston.

5. A garden implement comprising an open end lifting cylinder for encircling the root clump of a plant, a piston slidable in the cylinder and having an annular ejecting flange for pushing the clump out of the cylinder, a head closing one end of the cylinder, a hollow piston rod slidable in said cylinder head and terminating in a handle for moving the piston in the cylinder, valve controlled passages in the piston rod for optionally connecting the chamber between the piston and the head to the open air or to the chamber on the opposite side of the piston, and means for retaining a supply of dust adjacent the opening of the passage leading to the last named chamber.

6. A garden implement comprising an open end cylinder, a head closing one end of the cylinder, a piston slidable in the cylinder, a hollow piston rod slidable in the cylinder head, a dust cup arranged on the piston on the side thereof nearest the cylinder head, and a valve controlled passage in the piston rod connecting the dust cup to the chamber on the opposite side of the piston.

7. A garden implement comprising an open end cylinder, a head closing one end of the cylinder, a piston slidable in the cylinder, a hollow piston rod slidable in the cylinder head, a dust cup arranged on the piston on the side thereof nearest the cylinder head, said piston rod having ports therein opening into the atmosphere and other ports opening into the chamber between the piston and the cylinder head and other ports opening into the dust cup, and a valve for controlling the movement of air through said ports when the piston is reciprocated in the cylinder.

8. A garden implement comprising an open end cylinder, a head closing one end of the cylinder, a piston slidable in the cylinder, a hollow piston rod slidable in the cylinder head, a dust cup arranged on the piston on the side thereof nearest the cylinder head, said piston rod having ports therein opening into the atmosphere and other ports opening into the chamber between the piston and the cylinder head and other ports opening into the dust cup, a valve in said piston rod having recesses opening into the bore of the piston rod and registrable with the ports opening into the chamber and having other recesses opening into the chamber on the opposite side of the piston and registrable with the ports opening into the dust cup, and means for turning said valve for optionally controlling the flow of air through said valve recesses.

WALTER W. KEOWN.